US009805205B2

(12) United States Patent
Talamo et al.

(10) Patent No.: US 9,805,205 B2
(45) Date of Patent: Oct. 31, 2017

(54) ADAPTIVE SYSTEM PROFILE

(71) Applicants:Konvax Corporation, Cambridge, MA (US); Fondazione Universitaria INUIT—"Tor Vergata", Rome (IT)

(72) Inventors: Maurizio Talamo, Rome (IT); Franco Arcieri, Rome (IT); Christian H. Schunck, Rome (IT)

(73) Assignee: Konvax Corporation, Cambridge, MA (US)

(*) Notice: Subject to any disclaimer, the term of this patent is extended or adjusted under 35 U.S.C. 154(b) by 223 days.

(21) Appl. No.: 14/626,279

(22) Filed: Feb. 19, 2015

(65) Prior Publication Data

US 2016/0246969 A1 Aug. 25, 2016

(51) Int. Cl.
| | | |
|---|---|---|
| *G06F 11/30* | (2006.01) | |
| *G06F 21/60* | (2013.01) | |
| *H04L 9/08* | (2006.01) | |
| *H04L 9/32* | (2006.01) | |
| *G06F 21/32* | (2013.01) | |
| *G06F 21/45* | (2013.01) | |

(52) U.S. Cl.
CPC ............ *G06F 21/602* (2013.01); *G06F 21/32* (2013.01); *G06F 21/45* (2013.01); *H04L 9/085* (2013.01); *H04L 9/0866* (2013.01); *H04L 9/0869* (2013.01); *H04L 9/3239* (2013.01); *H04L 2209/24* (2013.01); *H04L 2209/34* (2013.01)

(58) Field of Classification Search
CPC ........ G06F 21/602; G06F 21/72; G06F 21/10; G06F 21/64; G06F 21/51; H04L 63/123; H04L 63/08; H04L 9/3281

USPC .......................................................... 713/189
See application file for complete search history.

(56) References Cited

U.S. PATENT DOCUMENTS

| | | | | |
|---|---|---|---|---|
| 6,901,145 | B1* | 5/2005 | Bohannon | G06F 21/31 380/277 |
| 7,274,804 | B2* | 9/2007 | Hamid | G06K 9/00885 340/5.52 |
| 2008/0276321 | A1 | 11/2008 | Svancarek et al. | |
| 2009/0319799 | A1* | 12/2009 | Carpenter | G06F 21/73 713/189 |
| 2010/0325734 | A1 | 12/2010 | Etchegoyen | |
| 2010/0333207 | A1 | 12/2010 | Etchegoyen | |
| 2013/0132734 | A1 | 5/2013 | Mao et al. | |
| 2014/0075420 | A1 | 3/2014 | Queru | |
| 2014/0359272 | A1* | 12/2014 | Hiltunen | G09C 1/00 713/150 |

* cited by examiner

*Primary Examiner* — Ali Abyaneh
(74) *Attorney, Agent, or Firm* — Occhiuti & Rohlicek LLP

(57) ABSTRACT

An approach to generating and regenerating a profile value from features of a system (e.g., a computer system), allows for certain changes of features of the system over time. The system may correspond to a client computer or a particular component of the client computer or a user of a client computer, and may also correspond to a combination of the user (i.e., a biometric characterization of the user) and the client computer or a component of the computer. The profile value may be used, for example, for purposes including identification, authentication, key generation, and other cryptographic functions involving the system.

19 Claims, 4 Drawing Sheets

ADAPTIVE SYSTEM PROFILE

BACKGROUND

This invention relates to use of an adaptive system profile, and more particularly to regeneration of a system-specific quantity using the system profile.

There are situations in which a software component executing on a device, such as a computer, desires to determine if the device is the same device on which it previously executed. For example, the software component may have been licensed for use on a single computer, and when the software component is executed at later times, the licensing of the host computer needs to be checked. One approach is to form a system profile of the computer, for example, based on types of components, specific serial numbers, etc. on the computer.

In related situations, a server computer may desire to determine if a client computer is the same computer with which it has previously communicated. One approach currently used is for the server computer to cause a quantity to be stored on the computer (e.g., as a browser "cookie") and later retrieval of the same quantity may indicate that the computer is the same. In another approach, a quantity related to the client computer, for instance a system profile of the client computer, is provided to the server computer and that profile is regenerated in different sessions to determine whether they match and therefore that the client computers are the same.

If the system profile is used as the basis of cryptographic operations that combines identifiers of one or more components, for example, using a key generation procedure, a change in the system profile, for example, based on replacement of a component of the system, may result in an invalid key being generated, and a computer that should have been declared to be the same as in a previous session is declared to be different.

Device recognition via hardware fingerprints is a well studied problem. In some devices special hardware chips are implemented to achieve this goal but such security chips are currently not included in most computing devices used in the market. Furthermore also for these chips mechanisms are required to assure that the chip is still integrated in the same hardware environment.

In general a significant problem is to keep the device fingerprint stable under changes to the system (like exchange and degrading of hardware components). If the device is not recognized after the exchange of e.g. a memory card expensive and time consuming procedures are required to solve this problem e.g. via a call center.

SUMMARY

There is a need be able to generate a profile value of a system (e.g., a computer system, a personal computing device, for instance a smartphone, tablet or laptop computer, a person/machine system, a device with an embedded processor, for instance a thermostat, etc.), for example, for purposes including but not limited to identification, authentication, key generation, and other cryptographic functions, while allowing for changes of the profile value over time. The system may correspond to a client computer or a particular component of the client computer or a user of a client computer, and may also correspond to a combination of the user (i.e., a biometric characterization of the user) and the client computer or a component of the computer.

In one aspect, in general, a method addresses initially generating and then repeatedly regenerating a profile value. In some examples, this profile value is used to regenerate a cryptographic key that is not otherwise stored in a persistent manner on the system. The method includes determining a plurality of features (e.g., numerical or numerically-representable features) of the system, and grouping the features into a plurality of groups such that at least some of the features are omitted from at least some of the groups. During the initial generation, a function (e.g., a function with a numerical output) of the features in each of the groups is computed to yield a plurality of corresponding group-specific values. Then the profile value is encoded using the group-specific values to yield an encoding that is stored, for instance on the system or at a location accessible to the system (e.g., on a computer server). The encoding is such that fewer than all the group-specific values are required to regenerate the profile value using the encoding. In regenerating the profile value, some or all of the plurality of features of the system are again determined, grouped into the plurality of groups used initially, and group-specific values are recomputed. In general, at least some of the group-specific values do not match the group-specific values computed initially (e.g., because the underlying features in the corresponding groups have changed). The system specific quantity is regenerated using the stored encoding and the recomputed group-specific values. In some examples, the profile value is again encoded using the recomputed group-specific values and stored for use in a subsequent regenerating of the profile value.

An advantage of at least some implementations is that some changes of the features of the system may change over time while still being able to regenerate the profile value. Furthermore, successive changes over time in those features can be accommodated to a greater degree than if the changes all occur at the same time.

Aspects of the approach are useful to uniquely identify/recognize a hardware device. In one example, the approach is used to uniquely recognize a company laptop computer or mobile phone as it logs remotely into the company network; uniquely recognize sensors and other remotely deployed devices as they make contact (e.g. through wireless networks) with their control units or other remotely deployed devices/sensors. In another example, the unique identification of the hardware device (in some cases combined with the identification of the user operating the device) may help to significantly reduce the risks of fraudulent access to remote resources. For example and employees can only have remote access to company emails via devices the company can uniquely recognize. Yet other examples include ensuring that software is installed and updated only on authorized devices (e.g. not more than a given number of devices). A final example includes ensuring that the hardware or configuration of a device has not been changed by a malicious user (e.g., by installing software probes) that wants to acquire information about device internals.

Other features and advantages of the invention are apparent from the following description, and from the claims.

DESCRIPTION

Figure 1:
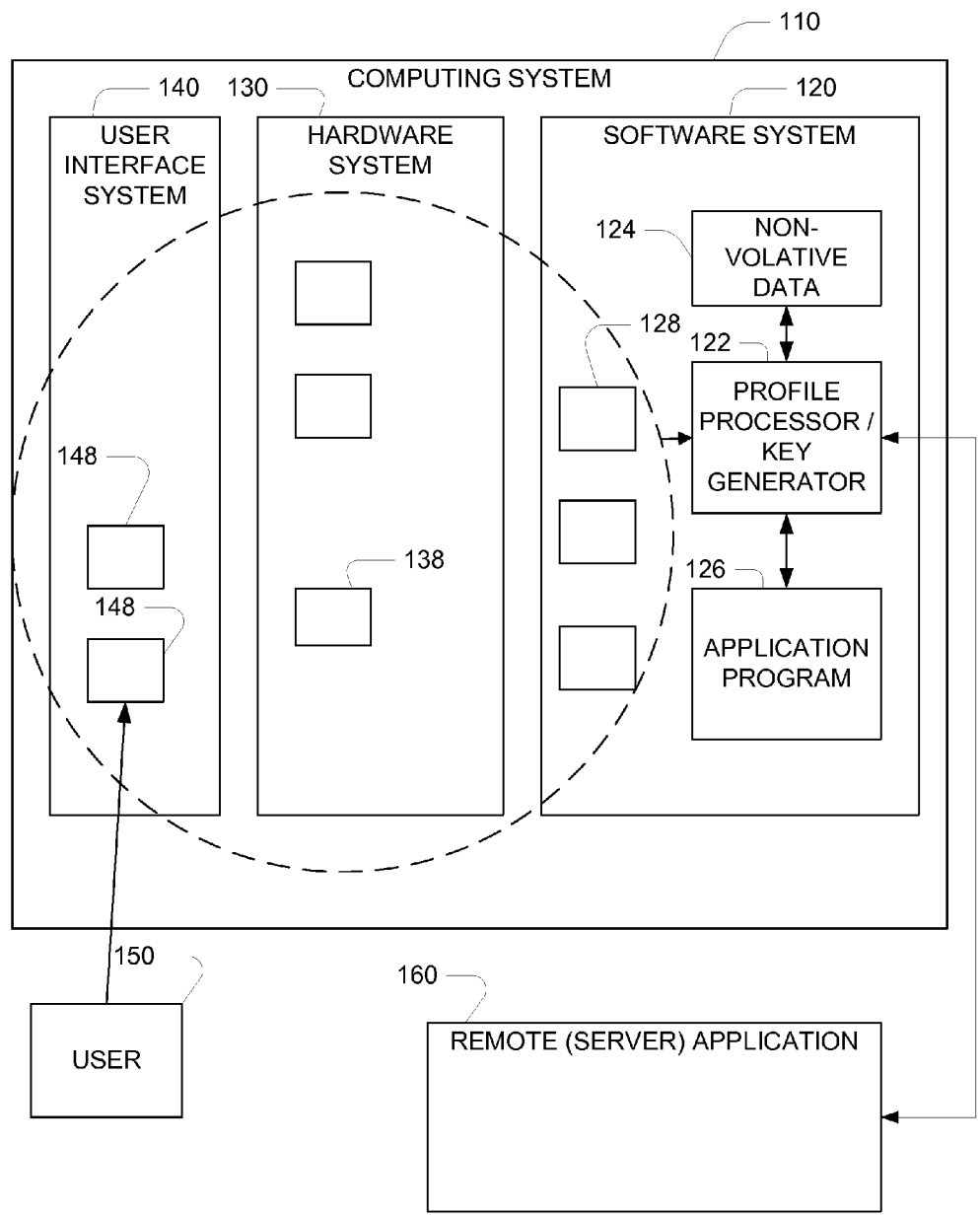
FIG. 1 is a block diagram of a computing system.

Referring to FIG. 1, in one embodiment, a client computing system 110 includes a software system 120, a hardware system 130, and an interface system 140 through which a user 150 interacts with the system 110. Singly or together, the user 150 and/or the client computing system 110 can be considered to be the "system" for which a profile value is generated and then regenerated as described below. The hardware system includes a number of components 138, such as processors, disk drives and controllers, memory systems, network interfaces, graphical boards, I/O boards, etc. The software system 120 includes components 128 that execute, or are used during execution, on the hardware system 130. Such components include software executables and libraries, data registries, etc. The interface system 140 includes components 148 that are able to accept input from the user or to sense inputs from the environment. For example, the components 148 can receive user inputs, such as password entry, or biometric information, such as fingerprints, retinal scans, etc. Not all of the components mentioned above are necessarily present in all examples of a computing system 110.

In this example, the user 150 uses the client system 100 to repeatedly interact with a remote server application 160, for instance over the public Internet and using a Web browsing protocol (e.g., http). In this example, the remote application 160 determines if the client computing device 100, or optionally the system including the combination of the user 150 and the client computing device 100, matches a previous session. Generally, this is accomplished by passing a system identification quantity, or alternatively a quantity derived from the system identification quantity (e.g., using a one-way function, a cryptographic key derived from the quantity, etc.), to the remote application. If the quantity passed from the client system matches the quantity that was previously passed from that system, the remote application determines that the client computing device, optionally in combination with the user, are the same as in the previous session.

Very generally, the system identification quantity is based on observations of components of the system, including observations of hardware-related characteristics, software-related characteristics, computer-behavior related characteristics, user input, and/or user biometric characteristics. It should be understood that these different observations do not all have to be used together, and that essentially any subset would be suitable for the techniques described below. Also, as discussed below, the approach to determining the system identification quantity is tolerant of certain changes of the underlying observations over time while maintaining consistency in the derived system identification.

Examples of observations of components include hardware related characteristics of the installed hard disks and for every hard disk the serial number, the logical disks, logical volume serial numbers together with the volume label, its capacity and related low level data.

Other examples of observations include software-related characteristics, for instance, identifiers or other quantities related to versions of software installed on the client computing device 100. Also, characteristics of software data structures, such as functions of the directory structure on a file system, contents of a system registry, etc. may be used as software-related observations. An example of how these observations can be obtained using the Windows Management Instrumentation (WMI) interface on Microsoft Windows Operating Systems or using the "/proc" and similar interfaces on Linux based Operating Systems.

Other examples of observations computer-behavior related characteristics include, for instance the time spent by the CPU to evaluate a well defined cycle that is completely executed inside the cache, or the same parameter when the cycle is executed outside the cache.

Yet other examples of observations include biometric observations include, for instance, biometric information, such as fingerprints, facial images, retinal scans, voice characteristic. In some implementations, acquisition of such biometric information is feasible with current smartphones (e.g., an Apple iPhone), which has microphone, camera, and fingerprint scanners in the device. Also, observations may include user inputs, such as password entry and/or interaction through a graphical interface.

The software system 120 also includes a profile processor 122, which in at least some embodiments also serves the specific role of a key generator and regenerator. Very generally, the profile processor 122 is able to generate and then later regenerate a quantity, referred to below as a SysID, from specific observations (e.g., measurement, retrieval, or query) of characteristics of the components 128, 138, 148 of the software, hardware, and/or user interface systems of the computing system 110. The regeneration is performed in such a manner that the SysID does not have to be stored in a non-volatile storage 124 of the system (or elsewhere away from the computing system 110). In at least some examples, the SysID is a unique cryptographically secure pseudo-random number, which can be used for cryptographic functions, such as key generation, encryption and/or authentication in interaction with a remote server application 160. However, it should be recognized that the SysID can be chosen freely depending on the application one has in mind and may have no relation to any device characteristics at all. Nevertheless, the device characteristics are used to produce an encoding of the SysID. In general, the profile processor 122 may store information that depends on the SysID in the non-volatile memory, which alone is not sufficient to regenerate the SysID. However, in combination with the results of repeated observations of the characteristics of the components 128, 138, 148, the profile processor is able to regenerate the SysID. Note that preferred implementations of the approach do not disclose the SysID outside the computing system 100. Note that in general, the observations that are used to generate the SysID are not disclosed outside the client system 100, thereby avoiding another party from being able to generate the SysID as an imposter.

A feature of the profile processor 122, and the method of regenerating the SysID, is that it is tolerant of changes in the observations of the components, at least to a limited degree or a limited rate of change. An example of a change may result from the replacement of a disk drive resulting in a change of an observation of a hardware component 138, or updating of a software library, resulting in a change of an observation of a software component 128.

Figure 2A:
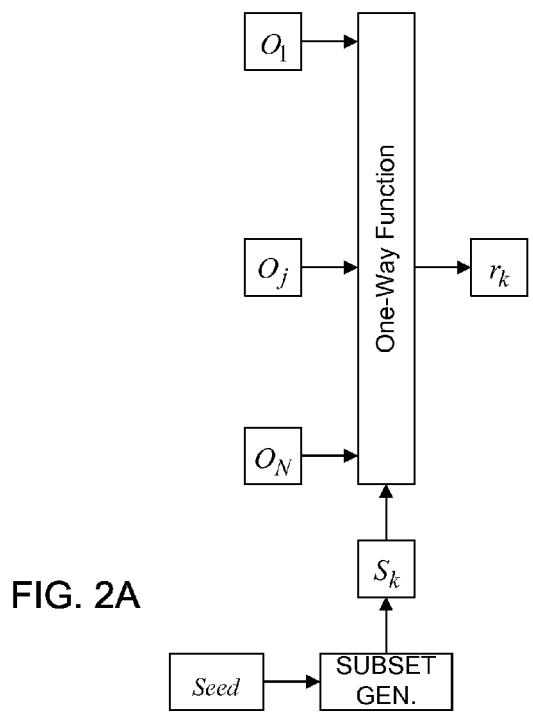
FIG. 2A is an illustration of generation of group-specific values during an initialization phase.
Figure 2B:
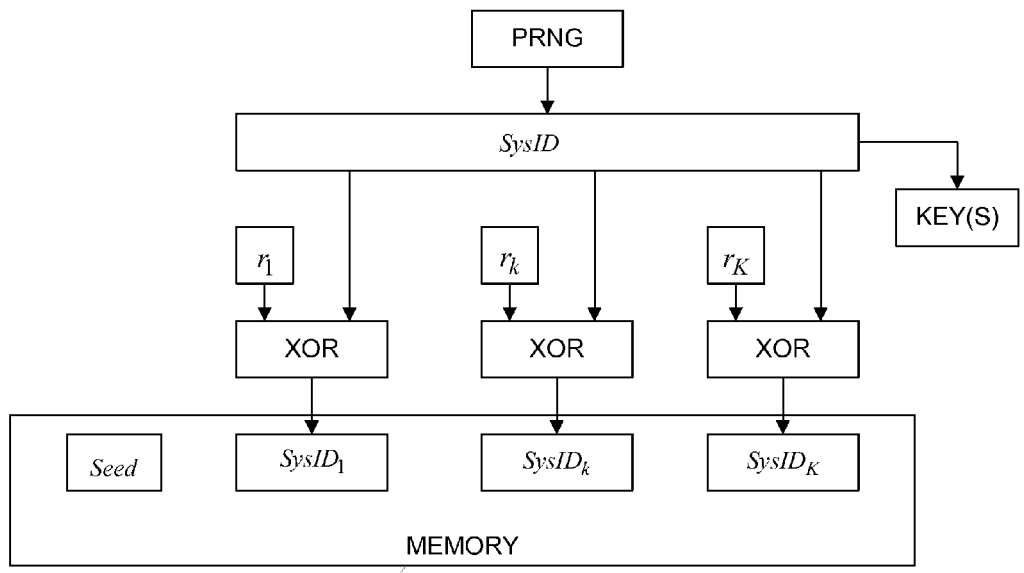
FIG. 2B is an illustration of generation of encodings of the profile value during the initialization phase.

Referring to FIGS. 2A-B, operation of the profile processor during an initial generation phase can be understood as follows. We assume that there are N components (e.g., in the order of 100 or more different observations), each providing one observation $O_n$ (e.g., a numerical quantity, and, more generally, a string) of a corresponding component 1≤n≤N. For example, an observation of a disk drive may depend on the serial number of drive or on the production date. The profile processor initially generates a random seed Seed (e.g., of at least 1024 bits) and stores it in the non-volatile storage 124. This random seed is used to generate K random subsets $S_k$ of the N observations. In some implementations, K is chosen such that K≈√N. Because the seed is retained in the non-volatile storage, the K subsets identifying the components may be regenerated at a later time.

In some implementations, the N observations are composed of n "buckets", each with s "slots", such that in total there are N=ns values. For example, each "bucket" is associated with one component (e.g., a network interface card), and an observation function $f_n()$ provides the s slot values for that component. For example, using the WMI interface for making observations in the Microsoft Windows operating systems provides such slot values.

Initially, the SysID is generated using a secure random number generator, for example, using a pseudo-random number generator (PRNG). The N observations $O_n$ of the components are made. For each subset $S_k$ a one-way function is applied to that subset of observations to yield a pseudo-random number $r_k$. Because of the application of the one-way functions, the original observations cannot be recovered from the pseudo-random numbers $r_k$. Referring to FIG. 2B, the SysID is then encoded K times, once with each of the pseudo-random numbers to yield K encodings $SysID_k$. These K encodings are stored in the non-volatile storage, along with the seed that is used to determine the subsets of the observations. The encoding function is such that the SysID cannot be recovered from the K encodings alone. In this implementation, the SysID can be decoded from any of the K encodings $SysID_k$ in combination with the corresponding pseudo-random number $r_k$. An example of the encoding makes use of an operator such as addition or XOR, which can be decoded using an inverse operator such as subtraction or XOR.

Figure 3A:
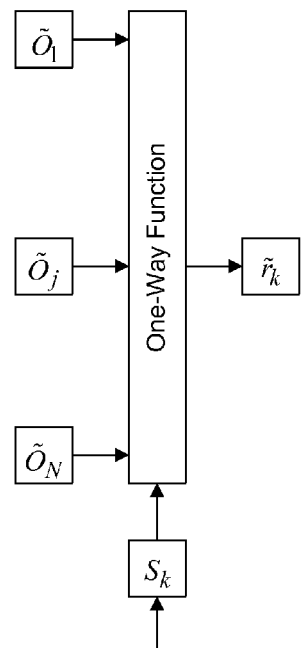
FIG. 3A is an illustration of generation of group-specific values during an regeneration phase.
Figure 3B:
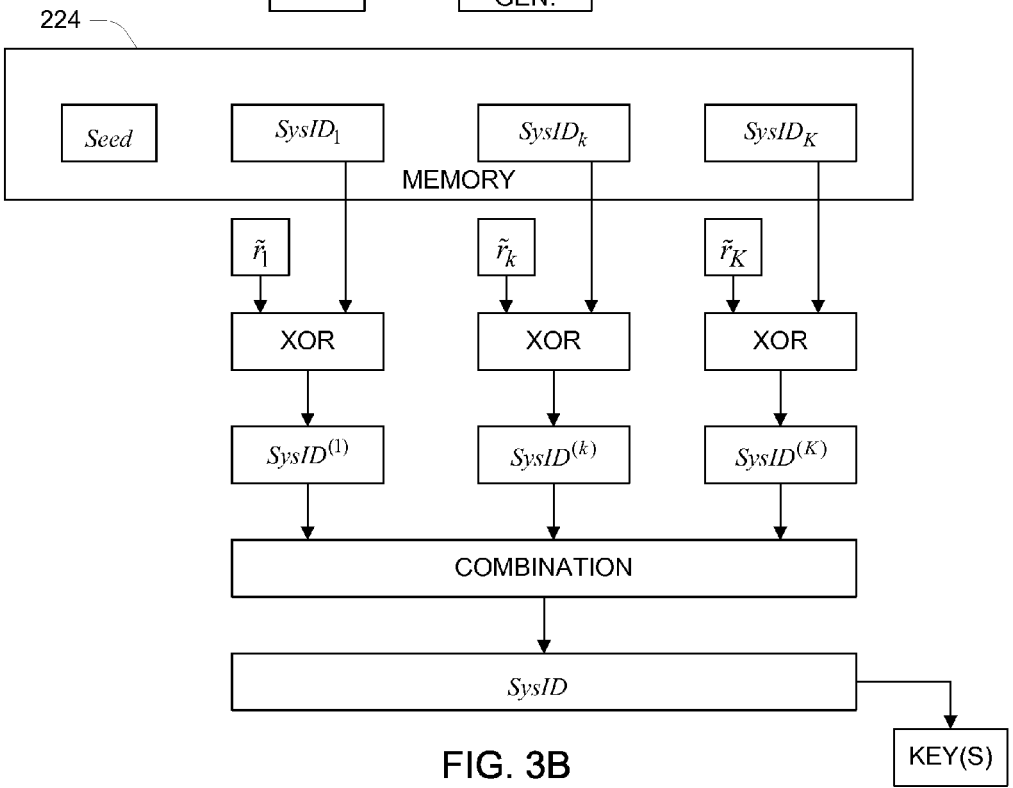
FIG. 3B is an illustration of regeneration of the profile value during the regeneration phase.
Figure 3C:
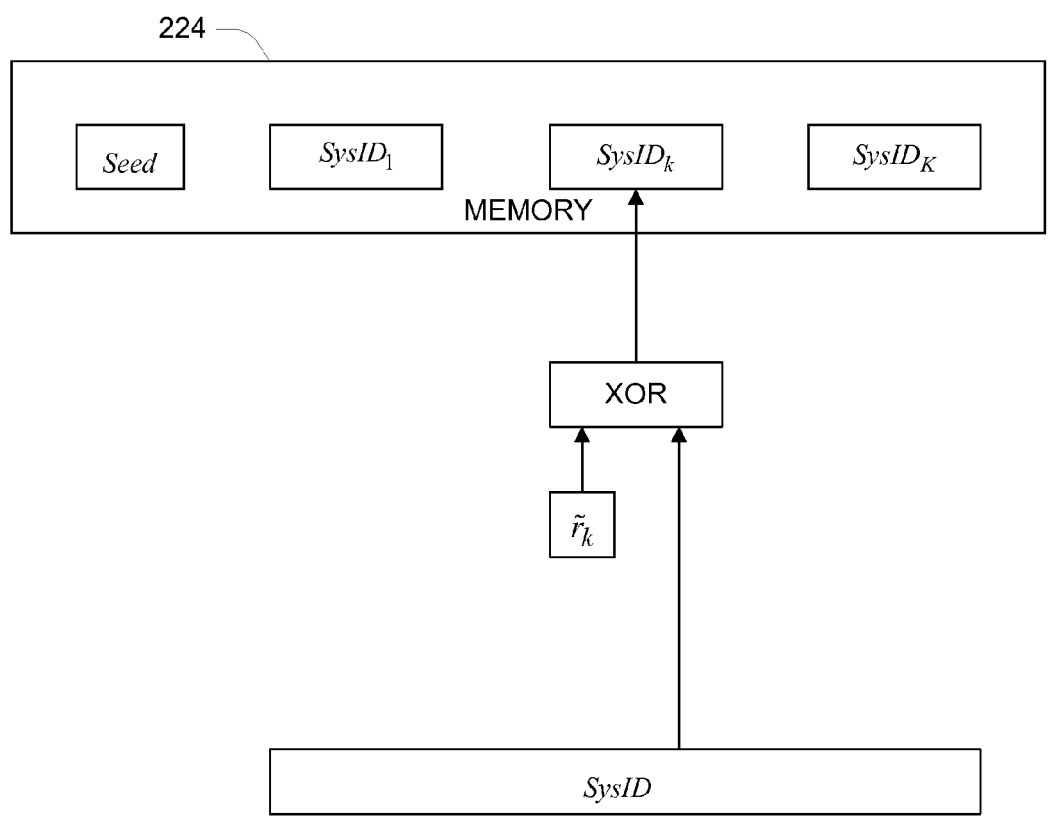
FIG. 3C is an illustration of updating of encodings of the profile value during the regeneration phase.

Referring to FIGS. 3A-C, later, during regeneration of the SysID, the process is repeated with N new observations $\tilde{O}_n$. The same subsets $S_k$ are used to generate new pseudo-random numbers $\tilde{r}_k$. Referring to FIG. 3B, each pseudo-random number $\tilde{r}_k$ is used to decode $SysID_k$ to form $SysID^{(k)}$. If the observation subsets are all different than those originally measured, then $\tilde{r}_k \neq r_k$ for all of the K subsets, and decoded $SysID^{(k)}$ obtained using $\tilde{r}_k$ will not yield SysID for any of the K subsets. However, assuming that at least l<k subsets have yielded the same subset of observations, at least l of the decodings will match.

Therefore, if the profile processor is configured to combine the $SysID^{(k)}$ values to require at least l same decoded values, and when such a decoding is achieved this same value is output as the SysID. Referring to FIG. 3C, then for all subsets k for which the decoding doesn't match, the SysID is re-encoded with $\tilde{r}_k$ to yield a new $SysID_k$, which is stored in the non-volatile storage for future regenerations of SysID.

Returning to the approach to generating the subsets $S_k$ from the seed S, one approach to forming the subset cryptographically securely involved forming K sets, each with M elements, where K=N/M. The N observations O=($O_1, \ldots, O_N$) are first shuffled to yield $O^{permuted}$.

In some implementations, transformations of the observations, including shuffling and/or other transformations make use of techniques related to a Blum Blum Shub random number generator. Specifically, an integer m=pq is selected for p and q prime and both congruent to 3 mod 4 (e.g., p=11 and q=19 yielding m=209). An initial value $x_0$ is iterated as $x_{n+1}=x_n^2$ mod m. A number k=$\log_2$(bits(m)) (e.g., k=3 for m=209) of least significant bits is selected, referred to as $lsb_k(x_{n+1})$. For a given "seed" $x_0$ a random number of N bits is formed as the concatenation of N/k k bit sequences: ($lsb_k(x_{N/k}), \ldots, lsb_k(x_1)$).

One approach to shuffling the observations make use of an iteration that is based on the random Seed stored at the client system 110. A particular implementation of such an approach performs a sequence of N exchanges of two elements of the observation vector, such that the $i^{th}$ exchange of $O_i$ and $O_p$, where the sequence of p values is computed using a Blum Blum Shub approach by initializing $x_0$=Seed, and generating the successive indices p as bits(N)-long random numbers as described above (not resetting x between successive indices).

Having permuted the observations, K subsets, each with N/K observations are formed, for example as predetermined subsets. For example, with K=√N, there are √N subsets each of √N observations.

In some embodiments, each observation $O_i$ is first transformed and replaced with $O_i'$ also using a Blum Blum Shub approach. In particular, each transformed observation is a bits(m) long, and computed by initializing $x_0=O_i$ and forming the transformed observation $O_i'$ as the concatenation of bits(m)/k k-bit sections.

The process for processing each set of makes use of a K*(K−1) long bit sequence Seq generated by a Blum Blum Shub random number generator staring with $x_0$=NewSeed, another random number known to the client device. Generally, $r_i$ for the $i^{th}$ set ($O_{i_1}', \ldots, O_{i_K}'$) is formed as a summation $r_i=O_{i_1}' \pm O_{i_2}' \ldots \pm O_{i_K}'$ where whether a plus or a minus of each term is determined by a successive bit of Seq.

In some implementations, the transformation of SysID using a quantity $r_k$ is formed as $SysID_k=r_k$−SysID.

In some examples, the SysID is used to generate asymmetric keys associated with the computing system 110. The SysID is split in two numbers, $q_1$ and $q_2$, with $q_1 \neq q_2$, each with half of the number of bits of SysID. Each of these numbers is then used to determine a corresponding prime number, $p_1$ and $p_2$, respectively using tests (e.g., Miller/Rabin, trial divisions, Fermat, Solovay-Strassen, etc.) for verifying the compositeness or the primality of the numbers and then, if composite, increase/decrease it until the next odd number and restart the test. The keys are generated from the prime numbers, for example, based on the asymmetric algorithm chosen (RSA, DSA, Blum Blum Shub, etc.). The primes are checked against other properties as requested by the algorithms to generate the private and public keys used for asymmetric cryptography.

In some examples, one or more keys generated from the SysID (or the SysID itself or some other deterministic function of the SysID) are used to determine a response to a challenge. For example, a remote system sends a challenge to the system, which determines the response based on a key value. The remote system received the response and determines if it matches the challenge.

In some examples, if a "public" key derived from the SysID of a device X is securely shared with another party S (e.g., a server) which keeps it as a secret (i.e. not "public"), then if the device X contacts S standard forms of authentication can be avoided in the following way: X just says "hello S; I am X" and starts an information exchange encrypted by its corresponding private key derived from the SysID (for example by encoding a symmetric key to be used in the following interaction). Then if S can correctly decipher and thus interpret the communications from X based on the use of the "public" key it previously received from X, S knows that it is in fact talking to X. No password exchange or any other form of authentication challenge will be required.

It should be understood that the specific approach to permitting decoding of the system profile value when one or a limited number of observations of the system have changed is but an example. Other approaches, which may or may not involve grouping of the observations into groups may be used. Furthermore, rather than repeated encoding of the profile value with different functions of the observations, other ways of generating the encoding, for example, based on error correction techniques, may be used.

Implementations of the approaches described above may make use of software, which may be stored on non-transitory machine-readable media and transported via computer or telecommunication networks. The software can include software for execution by a processor on a client device and can include software for execution on a computer (e.g., a server computer) remote from the client device and in data communication with the client device.

It is to be understood that the foregoing description is intended to illustrate and not to limit the scope of the invention, which is defined by the scope of the appended claims. Other embodiments are within the scope of the following claims.

What is claimed is:

1. A method for secure interaction with a remote system by repeatedly generating a profile value on a system, the method comprising:
   in a first phase,
      determining a plurality of features of the system,
      grouping the determined features into a plurality of groups such that at least some features of the plurality of features is omitted from each group of one or more of the groups,
      computing a function of the features in each of the groups to yield a plurality of corresponding group-specific values,
      encoding a profile value using the group-specific values to yield an encoding such that the profile value is regeneratable from the encoding and fewer than all the group-specific value,
      storing said encoding, and
      removing the profile value from the system, and
   repeatedly in successive phases after the first phase,
      without accessing stored information that depends on the profile value from which the profile value is regeneratable, determining some or all of the plurality of features of the system,
      grouping the determined features into at least some of the plurality of groups used in a prior phase of the first phase or the successive phases, and
      recomputing the function of the features in each of the at least some of the groups to yield a plurality of corresponding recomputed group-specific values,
      processing the stored encoding and the recomputed group-specific values to yield a regenerated profile value; and
      securely interacting with the remote system based at least in part on the regenerated profile value, wherein security interacting includes at least one of generating one or more cryptographic keys based at least in part on the regenerated profile value and interacting with the remote system using the one or more keys, authentication of the system to the remote system based at least in part on the regenerated profile value, responding to a challenge from the remote system based at least in part on the regenerated profile value, and securely exchanging information with the remote system based at least in part on the regenerated profile value.

2. The method of claim 1 wherein the profile value comprises a pseudo-random value.

3. The method of claim 1 further comprising, in the first phase and in a successive phase, using the profile value to generate a cryptographic key.

4. The method of claim 3 further comprising, in the successive phase, using the cryptographic key for an interaction between the computing system and another computing system.

5. The method of claim 3 further comprising, in the successive phase, using the decoded profile value for at least one of authentication and secure communication between the computing system and another computing system.

6. The method of claim 1 wherein the features of the system comprise a feature selected from a group consisting of hardware features, software features, user features, and environment features.

7. The method of claim 1 wherein during at least some of the successive phases after the first phase, the method further includes:
   encoding the regenerated profile value using recomputed group-specific values to yield a recomputed encoding, and storing said recomputed encoding for use a subsequent phase.

8. The method of claim 1 wherein encoding the profile value using the group-specific values to yield the encoding includes separately encoding the profile value using each group-specific values to yield corresponding group-specific encodings.

9. The method of claim 8 wherein processing the stored encoding and the recomputed group-specific values includes using the group-specific encodings to generate a plurality of decodings of the profile value.

10. The method of claim 9 wherein processing the stored encoding and the recomputed group-specific values further includes determining the profile value according to a relative majority of the decodings of the profile value.

11. The method of claim 9 wherein processing the stored encoding and the recomputed group-specific values further includes determining the profile value according to a threshold number of the decodings of the profile value having a same value.

12. The method of claim 1 wherein the plurality of groups are specified using a random number.

13. The method of claim 12 wherein grouping the determined features in the initial phase and in the successive phases includes determining the random number.

14. The method of claim 1 wherein computing a function of the features in a group includes using a non-invertible mathematical function.

15. The method of claim 1 wherein the system belongs to a group consisting of a personal computing device and a device with an embedded processor.

16. The method of claim 1 wherein the system comprises a person, and the features comprise one or more biometric features of the person.

17. The method of claim 1 wherein the system comprises a computing system, and the features comprise one or more computing hardware features of the computing system.

18. The method of claim 1 wherein the system comprises a computing system, and the features comprise one or more software features of the computing system.

19. A non-transitory machine-readable medium having software comprising instructions stored thereon that when executed by a processor:
  in a first phase,
    determine a plurality of features of a system,
    group the determined features into a plurality of groups such that at least some features of the plurality of features is omitted from each group of one or more of the groups,
    compute a function of the features in each of the groups to yield a plurality of corresponding group-specific values,
    encode a profile value using the group-specific values to yield an encoding such that the profile value is regeneratable from the encoding and fewer than all the group-specific values,
    storing said encoding, and
    removing the profile value from the system, and
  repeatedly in successive phases after the first phase, without accessing stored information that depends on the profile value from which the profile value is regeneratable,
    determine some or all of the plurality of features of the system,
    group the determined features into at least some of the plurality of groups used in a prior phase of the first phase or the successive phases, and
    recompute the function of the features in each of the at least some of the groups to yield a plurality of corresponding recomputed group-specific values, and
  processing the stored encoding and the recomputed group-specific values to yield a regenerated profile value; and
  securely interacting with a remote system based at least in part on the regenerated profile value, wherein securely interacting includes at least one of generating one or more cryptographic keys based at least in part on the regenerated profile value and interacting with the remote system using the one or more keys, authentication of the system to the remote system based at least in part on the regenerated profile value, responding to a challenge from the remote system based at least in part on the regenerated profile value, and securely exchanging information with the remote system based at least in part on the regenerated profile value.

\* \* \* \* \*

UNITED STATES PATENT AND TRADEMARK OFFICE
CERTIFICATE OF CORRECTION

PATENT NO. : 9,805,205 B2
APPLICATION NO. : 14/626279
DATED : October 31, 2017
INVENTOR(S) : Maurizio Talamo, Franco Arcieri and Christian H. Schunck Page 1 of 1

It is certified that error appears in the above-identified patent and that said Letters Patent is hereby corrected as shown below:

On the Title Page

Please replace item (71) Applicants: Konvax Corporation, Cambridge, MA (US); Fondazione Universitaria INUIT - "Tor Vergata", Rome (IT) to read:
Applicant: Konvax Corporation, Cambridge, MA (US)

Signed and Sealed this
Thirteenth Day of February, 2018

Andrei Iancu
*Director of the United States Patent and Trademark Office*